Jan. 12, 1954 A. RAPPL 2,665,740
MOTOR VEHICLE SEAT
Filed Feb. 7, 1948
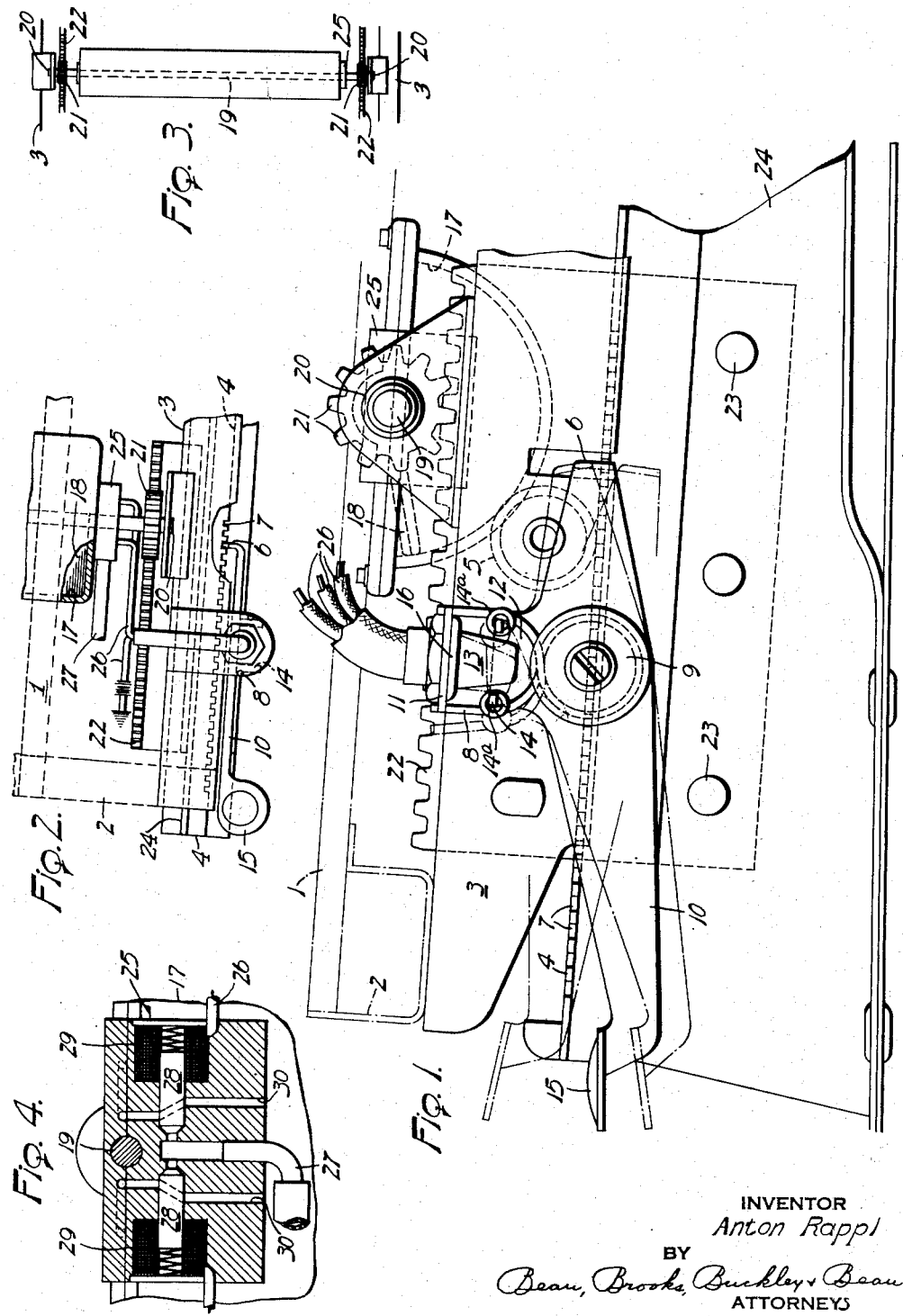
INVENTOR
Anton Rappl
BY
Bean, Brooks, Buckley & Bean
ATTORNEYS Patented Jan. 12, 1954

2,665,740

UNITED STATES PATENT OFFICE 2,665,740

MOTOR VEHICLE SEAT

Anton Rappl, Eggertsville, N. Y., assignor to Trico Products Corporation, Buffalo, N. Y.

Application February 7, 1948, Serial No. 6,880

3 Claims. (Cl. 155—14)

This invention relates to certain new and useful improvements in an adjustable car seat wherein the seat is slidably supported for positioning the driver within proper reach of the controls of the motor vehicle.

The primary object of the invention is to simplify the seat mounting and adjustment for compactness and ease of installation. Further, the invention resides in an improved action which is practical and economical in design and durable in construction.

The foregoing and other objects will manifest themselves as this description progresses wherein reference to the accompanying drawing is made in which Fig. 1 is a fragmentary side elevation of the improved seat mechanism;

Fig. 2 is a fragmentary plan view thereof;

Fig. 3 is a view showing the motor arrangement thereof; and

Fig. 4 is a transverse sectional view.

Referring more particularly to the accompanying drawing, the numeral 1 designates the bottom frame of the upholstered automobile seat, 2 a transverse brace and 3 the side members, the members 2 and 3 constituting the seat substructure which is movable fore and aft on a pair of parallel rails 4 with anti-friction wheels 5 being interposed. A latch 6 on the sub-structure engages selectively the recesses 7 alongside the adjacent rail, which serves also as a keeper bar, under the urge of a double acting spring 8. The latch is pivotally mounted at 9 and has a handle 10 by which it may be lifted or depressed from engagement with the keeper bar or its recesses 7. The spring 8 coils about the latch pivot and has its opposite ends freely bearing on the opposite sides of a switch mounting bracket 11 which is mounted by the member 3, as shown. A second arm 12 on the latch lever 6, 10 upstands alongside of the rockable switch knob 13 and has a pair of lugs 14 straddling the latter to rock it. If desired, the lugs 14 may be fitted with rubber sleeves 14a to provide a resilient bearing contact with the knob 13. These lugs at their remote sides bear outwardly upon the spring ends to enable the latter to restore the lugs and the switch knob to neutral position. Thus the spring 8 has a three point mount at the latch pivot 9 and the two lugs 14 whereby resilient neutral position restoring forces result as the spring ends bear against the sides of the bracket 11, as shown. By depressing the finger piece 15 the latch 6 will be lifted from its keeper and the switch knob will be rocked to close the conventional single pole double throw toggle switch 16 for one seat adjustment, and by lifting the finger piece the latch will be depressed from its keeper and the switch knob will be rocked in the opposite direction to effect an opposite adjustment of the seat, as will now more fully appear.

A motor is provided to shift the seat upon its supporting rails 4. Herein the motor is of the fluid type and as illustrated comprises a chamber 17, of substantially semi-cylindrical shape, and a vane or piston 18 fixed upon a shaft 19 for swinging therein. The shaft extends from the opposite ends of the motor chamber and has journal support in bearings 20 on the side frame members 3. Between these bearings and the adjacent end walls of the motor chamber the shaft fixedly carries pinions 21 which mesh with the racks 22 secured by fasteners 23 to the supporting webs 24 which also mount the rails 4. Therefore, fluid actuation of the motor will cause the pinions to track upon the racks and accordingly adjust the seat. The pinion and rack engagement at each side of the seat carried motor will constitute a motion equalizer and serve to impart a true translatory motion to the seat.

The fluid pressure differential is applied to the motor vane 18 by an electromagnetic valve arrangement 25 which is electrically connected by wires 26 to the switch 16 so that when the latter is closed one valve port will open the operating pressure supply line 27 to one side of the chamber and another valve port will open the opposite side of the chamber to the atmosphere. The operating pressure may be sub-atmospheric and the pressure line 27 may lead to the engine intake manifold as a source of operating pressure and the valve may be of an approved type such as is shown in Fig. 4 wherein the corresponding one of the normally closed valve members 28 is opened by the magnets 29 to admit the suction influence and concurrently close off the normally opened atmospheric vents 30.

The seat adjusting mechanism is compact in arrangement in that the usual motion equalizing unit is combined with the motor shaft, and further in that the power of the motor shaft is transmitted directly to the motivating pinions which drive the seat forwardly or backwardly. And while the foregoing description has been given in detail it is not intended thereby to limit the invention since the inventive principles involved are capable of assuming other physical embodiments without departing from the spirit of the invention and the scope of the appended claims.

What is claimed is:

1. An adjustable seat comprising a supporting structure spaced side rails, a seat structure movable fore and aft on the rails, motion directing means for securing translatory motion of the seat structure and including a transverse shaft journaled on one structure and having its opposite ends geared to the companion structure to equalize the motion of the seat at its opposite sides with respect to said supporting structure, a fluid motor having a piston fixed to said shaft and operating in a chamber, and a control for the motor including means at one side for locking the two structures together when the motor is inoperative and acting through the motion equalizing power shaft to hold the structure at the opposite side in its adjusted position.

2. An adjustable vehicle seat comprising a supporting structure, a seat frame structure adapted for translatory movement thereon, a transversely arranged motor mounted on one structure and having an oscillatory shaft extending therethrough with its axis transverse to the direction of said movement, the opposite ends of said shaft being geared to the companion structure for driving the seat upon its support with said translatory movement, said shaft serving in a dual capacity as a power shaft and also as a motion equalizing shaft, and manually operable means for controlling the energization of said motor.

3. An adjustable seat comprising a supporting structure having spaced side rails, a seat structure movable fore and aft on the rails, motion directing means for securing translatory motion of the seat structure and including a transverse shaft journaled on one structure and having its opposite ends in driving engagement with the companion structure for equalizing the seat movement at the opposite sides thereof with respect to said supporting structure, and a fluid motor having a piston fixed to said shaft and operating in a chamber to apply the force of the fluid pressure to the motion equalizing shaft.

ANTON RAPPL.

References Cited in the file of this patent

UNITED STATES PATENTS

| Number | Name | Date |
|---|---|---|
| 1,700,308 | Chilson et al. | Jan. 29, 1929 |
| 1,756,147 | Clark | Apr. 29, 1930 |
| 1,962,789 | Simpson et al. | June 12, 1934 |
| 2,432,895 | Horton | Dec. 16, 1947 |
| 2,592,166 | McLean et al. | Apr. 8, 1952 |